(12) United States Patent
Drewes et al.

(10) Patent No.: US 10,232,837 B2
(45) Date of Patent: Mar. 19, 2019

(54) SUPPORT UNIT

(71) Applicant: SAF-HOLLAND GmbH, Bessenbach (DE)

(72) Inventors: Olaf Drewes, Aschaffenburg (DE); Oliver Marschner, Haibach (DE)

(73) Assignee: SAF-HOLLAND GmbH, Bessenbach (DE)

( * ) Notice: Subject to any disclaimer, the term of this patent is extended or adjusted under 35 U.S.C. 154(b) by 147 days.

(21) Appl. No.: 15/312,112

(22) PCT Filed: May 18, 2015

(86) PCT No.: PCT/EP2015/060850
§ 371 (c)(1),
(2) Date: Nov. 17, 2016

(87) PCT Pub. No.: WO2015/177073
PCT Pub. Date: Nov. 26, 2015

(65) Prior Publication Data
US 2017/0120883 A1    May 4, 2017

(30) Foreign Application Priority Data
May 20, 2014    (DE) .................. 10 2014 209 502

(51) Int. Cl.
*F16D 51/00* (2006.01)
*B60T 17/08* (2006.01)
*F16D 65/00* (2006.01)

(52) U.S. Cl.
CPC ............ *B60T 17/088* (2013.01); *F16D 51/00* (2013.01); *F16D 65/0056* (2013.01); *F16D 2051/003* (2013.01)

(58) Field of Classification Search
CPC .............. B60T 17/088; F16D 65/0056; F16D 2055/0008; F16D 55/22655; F16D 2051/003
(Continued)

(56) References Cited

U.S. PATENT DOCUMENTS 3,136,227 A * 6/1964 Williams .............. B60T 17/086
 92/128
3,269,492 A * 8/1966 Cox ........................ F16D 65/22
 188/152

(Continued)

FOREIGN PATENT DOCUMENTS

DE    2550855    5/1976
GB    1418630    12/1975
(Continued)

OTHER PUBLICATIONS

European Patent Office, International Search Report, dated Sep. 16, 2015.

*Primary Examiner* — Thomas J Williams
*Assistant Examiner* — James K Hsiao
(74) *Attorney, Agent, or Firm* — Prive Heneveld LLP

(57) ABSTRACT

A support unit includes a first flange portion, a second flange portion and a guiding portion, wherein the first flange portion has a first engagement geometry for securing the support unit to a chassis, wherein the second flange portion has a second engagement geometry for securing a brake cylinder, wherein the guiding portion is arranged adjacent to the second flange portion and has a guiding geometry for guiding a guiding element along a guiding axis, wherein an expansion wedge unit is provided adjacent to the guiding portion and wherein the expansion wedge unit has a housing which is constructed integrally with the guiding portion.

24 Claims, 3 Drawing Sheets

(58) Field of Classification Search
USPC .................................................. 188/340, 343
See application file for complete search history.

(56) References Cited

U.S. PATENT DOCUMENTS

| | | | | |
|---|---|---|---|---|
| 3,322,241 | A | 5/1967 | Cox et al. | |
| 3,476,217 | A | 11/1969 | Knapp | |
| 4,013,150 | A * | 3/1977 | Crabtree | F16D 65/22 |
| | | | | 188/106 F |
| 4,350,230 | A * | 9/1982 | Ingram | F16D 51/10 |
| | | | | 188/335 |
| 4,369,863 | A * | 1/1983 | Farr | F16D 51/18 |
| | | | | 188/106 A |
| 4,445,597 | A * | 5/1984 | Baltare | F16D 51/20 |
| | | | | 188/206 A |
| 4,519,482 | A * | 5/1985 | Ott | F16D 65/22 |
| | | | | 188/343 |
| 4,537,293 | A * | 8/1985 | Osborne | F16D 65/22 |
| | | | | 188/196 BA |
| 4,621,713 | A * | 11/1986 | Carre | B60T 17/083 |
| | | | | 188/343 |
| 4,784,244 | A * | 11/1988 | Carre | B60T 13/741 |
| | | | | 188/156 |
| 5,301,774 | A * | 4/1994 | Cho | B60T 1/067 |
| | | | | 164/98 |
| 5,316,111 | A * | 5/1994 | Layfield | F16C 23/045 |
| | | | | 188/205 R |
| 5,613,577 | A | 3/1997 | Collin | |
| 6,415,896 | B1 * | 7/2002 | Arai | F16D 51/20 |
| | | | | 188/106 F |
| 6,640,937 | B2 | 11/2003 | Bunker | |
| 9,709,107 | B2 * | 7/2017 | Tiger | F16D 65/0056 |
| 2010/0193303 | A1 * | 8/2010 | Li | F16D 51/20 |
| | | | | 188/206 A |
| 2014/0291093 | A1 * | 10/2014 | Drewes | F16D 65/28 |
| | | | | 188/340 |
| 2015/0014512 | A1 * | 1/2015 | Pierce | F16D 65/0056 |
| | | | | 248/674 |
| 2015/0053516 | A1 * | 2/2015 | Drewes | F16D 51/20 |
| | | | | 188/219.1 |
| 2015/0075926 | A1 * | 3/2015 | Moss | F16D 51/00 |
| | | | | 188/219.1 |
| 2015/0167762 | A1 * | 6/2015 | Tiger | F16D 51/22 |
| | | | | 188/74 |
| 2015/0232077 | A1 * | 8/2015 | Gaufin | B60T 13/38 |
| | | | | 188/1.11 R |
| 2017/0030422 | A1 * | 2/2017 | Berwanger | F16D 51/22 |

FOREIGN PATENT DOCUMENTS

| | | |
|---|---|---|
| RU | 2340484 | 12/2008 |
| RU | 2011136683 | 3/2013 |
| WO | 2013/087746 | 6/2013 |
| WO | 2013087737 | 6/2013 |

\* cited by examiner

SUPPORT UNIT

BACKGROUND OF THE INVENTION

The present invention relates to a support unit for use in brake systems of motor vehicles, preferably utility vehicles.

Support units are known from the prior art in so far as there are provided generally cast brake carriers to which the different subassemblies of the vehicle brake can be secured and are connected, for example, to the axle by means of the brake carrier. In this case, the brake carriers known from the prior art generally have the disadvantage that they are constructed to be heavy and, as a result of a large number of components which are intended to be assembled, require a high level of complexity in terms of assembly. In particular in the field of expansion wedge drum brakes, it has previously been necessary to secure an expansion wedge unit to a brake carrier by means of welding or screwing and to provide additional adapter elements for fitting the brake cylinder. These additional adapter elements on the one hand increase the structural space requirement and, on the other hand, also provide a large number of susceptible connection locations by means of which, for example, dirt and fluids can enter the internal region of the expansion wedge unit. There is therefore a significant requirement for improvement with respect to compactness, susceptibility to malfunction and assembly of a brake system.

An object of the present invention is to provide a support unit which both simplifies the assembly of the brake system and also saves weight and structural space and reduces the susceptibility to malfunction of the brake system.

SUMMARY OF THE INVENTION

According to the invention, the support unit comprises a first flange portion, a second flange portion and a guiding portion, wherein the first flange portion has a first engagement geometry for securing the support unit to a chassis, wherein the second flange portion has a second engagement geometry for securing a brake cylinder, wherein the guiding portion is arranged adjacent to the second flange portion and has a guiding geometry for guiding a guiding element along a guiding axis, wherein an expansion wedge unit is provided adjacent to the guiding portion and wherein the expansion wedge unit has a housing which is constructed integrally with the guiding portion. A significant feature of the support unit is that an expansion wedge unit is constructed integrally with the support unit, wherein in particular the housing of the expansion wedge unit is constructed integrally with the correspondingly adjacent portion of the support unit. The guiding portion of the support unit is in this instance provided adjacent to the housing of the support unit. The guiding portion is a portion of the support unit which is constructed at least partially in the form of a hollow member and in which a guiding element is arranged so as to be able to be displaced along a guiding axis. The guiding element is used in this instance particularly preferably to transfer the force of a braking force which leads from a brake cylinder which is flanged to the second flange portion to a corresponding expansion wedge mechanism which is arranged in the expansion wedge unit. The guiding portion further has the function of shielding both the geometry of the expansion wedge unit and the guiding element and the brake cylinder against the introduction of dirt, foreign bodies and fluids. By the housing of the expansion wedge unit being constructed integrally with the guiding portion, it is advantageously possible to avoid between the expansion wedge unit and the support unit an additional internal interface by means of which dirt and fluids could be introduced during normal operation of the support unit. The first flange portion has a first engagement geometry for securing the support unit to a chassis, wherein the first engagement geometry is preferably a standardized engagement geometry which can be brought into engagement as standard on chassis of different utility vehicles or utility vehicle types. In a particularly preferred manner, the second engagement geometry of the second flange portion is also a standardized interface for securing a brake cylinder, which is characterized in particular by preferably two engagement geometries which are provided with a specific standardized spacing from each other. Advantageously, the support unit can therefore be integrated in brake systems which are already provided, wherein the previously used brake cylinder can continue to be used.

In a preferred embodiment, the second flange portion is constructed integrally with the guiding portion. That is to say, the second flange portion is in this instance preferably constructed as an integral cast component together with the guiding portion, wherein a subsequent assembly of the second flange portion on the guiding portion can advantageously be prevented and at the same time there can be used wall or cross-section geometries which enable particularly good force transmission with at the same time small wall thickness. As a result of the integral construction of the second flange portion and the guiding portion, in this instance the weight of the support unit can be reduced and the assembly complexity for fitting a brake cylinder to the support unit can be significantly reduced since a fitter only has to handle one component.

Advantageously, the support unit has a retention portion which adjoins the first flange portion and the guiding portion and which extends substantially along a retention axis, wherein the first flange portion, the retention portion and the guiding portion are constructed integrally with each other. The retention portion is preferably used to position the guiding portion and consequently also the first flange portion which is preferably integrally connected to the guiding portion and the expansion wedge unit which is preferably integrally connected to the guiding portion relative to the chassis. In this instance, the retention portion preferably has an extent along a retention axis, wherein the extent of the retention portion along the retention axis, or parallel with the retention axis is preferably the greatest extent thereof. Advantageously, there are provided in the transition region between the retention portion and the first flange portion outer geometries of the retention portion which are optimized in terms of force flow, that is to say, preferably rounded outer geometries on which advantageously only a small notch effect occurs when the first flange portion and the retention portion are subjected to bending stress. Using such geometries which are optimized in terms of force flow, the required wall thicknesses can be reduced, the weight can be reduced and nonetheless the required forces and torques can be transmitted.

In another preferred embodiment, the retention axis is located transversely, preferably perpendicularly, relative to the guiding axis. With the arrangement of the retention portion with the resultant direction in which the retention axis extends, a precise positioning of the force transmission direction from the brake cylinder to the expansion wedge unit is defined. The perpendicular orientation of the retention portion with the retention axis thereof and the guiding portion with the guiding axis thereof relative to each other particularly preferably ensures a uniform force transmission in the event of bending loads, which are transmitted to the support unit by means of the relatively heavy brake cylinder or which are transmitted to the expansion wedge unit by means of oscillations, for example, of the brake jaws.

Advantageously, the first engagement geometry extends substantially along an engagement axis, wherein the retention axis is pivoted through an angle with respect to the engagement axis and wherein the angle is smaller than 90°. It is further preferable for the engagement axis, along which the engagement geometry extends or along which the engagement geometry can advantageously be brought into engagement with the chassis of a utility vehicle, to be arranged substantially parallel with an axial direction of the chassis, for example, parallel with the rotation direction of the vehicle wheels. The term "substantially" is intended to mean in the context of the present invention that smaller deviations, for example, caused by production tolerances in the context of the present invention are considered to be parallel. Advantageously, the support unit is secured to the chassis of the utility vehicle along the engagement axis which advantageously extends parallel with the axial direction, wherein particularly preferably good accessibility of the corresponding securing means along the engagement axis is provided. In a further preferred manner, the retention axis is pivoted through an angle with respect to the engagement axis, wherein this angle is smaller than 90°. In a particularly preferred manner, the angle in this instance is measured at the side of the support unit at which the expansion wedge unit is located. As a result of an arrangement of the retention axis in an oblique manner relative to the engagement axis, it is possible to allow the upper portion of the support unit, that is to say, the region comprising the expansion wedge unit, guiding portion and second flange portion, to protrude into the inner side of a brake drum in order to be able to bring the expansion wedge unit into engagement with the brake jaws which are provided at that location. Furthermore, as a result of the oblique arrangement of the retention axis, the brake cylinder is also arranged with sufficient spacing from the axis of the utility vehicle so that, in the event of oscillations in the chassis system, no damage occurs as a result of oscillations and contact which occurs between the brake cylinder and adjacent geometries of the chassis. In the event that, in the three-dimensional space, the engagement axis and the retention axis do not intersect, it is preferable for the angle between the engagement axis and retention axis to be determined as an angle between the projections of the engagement axis and the retention axis on a plane of section which preferably extends through the guiding portion.

In a preferred embodiment, the angle is in the range from 45° to 89°, preferably in the range from 60° to 85° and in a particularly preferred manner approximately from 70° to 85°. The relatively widely selected range from 45° to 89° is in this instance preferred for support units which are configured for securing a particularly large number of different brake cylinders. It has been found that in this range from 45° to 89° all currently commercially available brake cylinders can be readily integrated in a brake system with a support unit according to the invention, without the fear of damage resulting from striking adjacent chassis geometries. The particularly preferred range from 60° to 85° has been found to be advantageous since in this manner a particularly compact construction of the support unit is achieved, wherein, on the one hand, sufficient spacing of a brake cylinder which is secured to the second flange portion from the adjacent chassis geometries is ensured and, on the other hand, the extent of the retention portion can be selected to be relatively small and in this manner weight can be saved.

The particularly preferred range from 70° to 85° has been found to be advantageous for use with expansion wedge brake units since in this instance optimum arrangement of the upper region of the support unit relative to the first engagement geometry or relative to the first flange portion can be achieved in order, on the one hand, with weight being saved and, on the other hand, with the simplest assembly possible, to integrate a support unit in the brake system of a utility vehicle.

Advantageously, the first engagement geometry can be brought indirectly and/or directly into positive-locking engagement with a corresponding portion of the chassis. An indirect positive-locking engagement is in this instance particularly preferably produced by means of a bolt or a screw connection. A direct positive-locking engagement may in this instance preferably be produced by means of a projection on the first flange portion or the first engagement geometry which engages in a positive-locking manner in a corresponding return geometry on the corresponding portion of the chassis in order, for example, to secure the support unit relative to the chassis against rotation about the engagement axis. A positive-locking connection of the support unit to the chassis is preferred in order, on the one hand, to ensure that the support unit can be disassembled from the chassis and, on the other hand, to be able to avoid the thermal tensions and occurrences of structural damage which occur with a previously conventional weld connection of the brake carrier to the chassis axle.

There is advantageously provided a securing element which can be moved along the engagement axis into positive-locking engagement with the first engagement geometry, wherein the securing element is accessible from the side of the support unit at which the expansion wedge unit is located. The securing element is preferably a screw or a threaded bolt and is advantageously accessible from the side of the support unit at which the expansion wedge unit is located. That is to say, the securing element is preferably accessible from the outer side of the chassis, that is to say, after the wheel and the brake drum of the brake unit have been disassembled from the chassis, the support unit can be disassembled in a simple manner from the outer side by releasing the securing element. In an alternatively preferred embodiment, the securing element may also be constructed as a nut which can be brought into engagement with a first engagement geometry which is constructed, for example, as a threaded rod.

In an alternatively preferred manner, the securing element may be accessible from the side of the support unit at which the second flange portion is located. In particular when it is preferable for the support unit, even without prior disassembly of the wheel, or the brake drum of the brake system to be able to be disassembled therefrom or to be able to be mounted thereon, it is preferable to arrange the securing element at the side of the support unit at which the second flange portion is located. That is to say, the securing element is thus accessible, preferably from the inner side of the chassis, wherein the first flange portion and the first engagement geometry are advantageously arranged spaced apart from the axle body and other subassemblies of the chassis to such an extent that there is sufficient space to insert a torque wrench or a screw device operated with compressed air.

In a particularly preferred manner, the first engagement geometry is constructed as a threaded hole. With this preferred embodiment, the assembly of the support unit on the chassis of a utility vehicle is simplified since only a screw has to be brought into engagement with an engagement geometry in order to secure the support unit to the chassis.

In particular, additionally provided nuts or other fixing elements are dispensed with. Advantageously, a self-securing ISO thread is provided as a thread type for the first engagement geometry.

In an alternatively preferred manner, the first engagement geometry is constructed as a threaded bolt and preferably constructed integrally with the first flange portion. With this alternatively provided embodiment of the first engagement geometry, the necessary number of individual components required for the assembly of the support unit can also be reduced, and consequently not only weight, but also assembly time can be saved.

In a particularly preferred embodiment, the first flange portion has two engagement geometries which are arranged spaced apart from each other, wherein the engagement axes of the respective engagement geometries extend parallel with each other. In particular in order to prevent pivoting of the support unit about an axial direction of the chassis, which direction advantageously extends parallel with the engagement axis, at least two first engagement geometries are provided. In order to keep the level of assembly complexity low, it is further preferable to provide no more than four first engagement geometries on the first flange portion, which can each individually be brought into engagement with the chassis of the utility vehicle. In this instance, the spacing of the engagement geometries from each other is preferably smaller than the extent of the retention portion along the retention axis. This preferred sizing of the spacing of the first engagement geometries relative to the extent of one or the at least two retention portions provided results in a favorable compromise between the weight resulting from the additional material and at the same time a sufficiently high level of securing of the support unit against rotation relative to the chassis.

Advantageously, there are provided two retention portions which are separated from each other by means of a free space, wherein the mean cross-sectional surface-area of the retention portions is at a ratio of from 0.2 to 1.3, preferably from 0.3 to 0.9 and in a particularly preferred manner from approximately 0.5 to 0.8 with respect to the mean cross-sectional surface-area of the free space. The sum of the cross-sectional surface-areas of the individual retention portions in a cross-section through the support unit is preferably selected as a mean cross-sectional surface-area of the retention portions, in which cross-section the mean cross-sectional thickness or width of the retention portion in the extent along the engagement axis of the engagement geometry located adjacent to the retention portion is present. The cross-sectional surface-area of the free space is preferably determined in the same plane of section through the support unit as the cross-sectional surface-area of the retention portions. In this case, the ratio of the two cross-sectional surface-areas with respect to each other is an expression of how "solidly" the retention portions are constructed. The smaller the ratio of the cross-sectional surface-area of the retention portions is relative to the cross-section of the free space, the more thin-walled or narrower are the retention portions constructed, wherein the weight is considerably reduced. In particular when the support unit is intended to have a relatively compact construction, take up little structural space and have a small spacing of the retention portions from each other, the free space in comparison with the retention portions is relatively small so that the ratio can increase up to 1.3. A favorable compromise between a lightweight structure and, on the other hand, a sufficiently high strength of the retention portions of the support unit has been found to be a range from approximately 0.5 to 0.8, wherein, in this ratio range, the best results in the context of the present invention could be achieved.

In a particularly preferred embodiment, the housing of the expansion wedge unit is produced from spheroidal graphite casting material. The construction from spheroidal graphite casting material allows in this instance, on the one hand, a precise configuration of the corresponding outer geometries or inner geometries of the expansion wedge unit and, on the other hand, a favorable connection by, for example, casting the housing of the expansion wedge unit on the corresponding guiding portion of the carrier unit which can be produced from a more advantageous material, which is less strong in comparison, than spheroidal graphite casting material. In this instance, the entire support unit together with the housing of the expansion wedge unit is particularly preferably constructed as a spheroidal graphite casting component.

Advantageously, the support unit has no more than four first engagement geometries, preferably no more than two first engagement geometries. As a result of the preferred reduction of the number of first engagement geometries, the assembly complexity is reduced. However, it has been found at the same time that, with increased requirement for strength, from three to four first engagement geometries are justified, although the assembly complexity increases.

BRIEF DESCRIPTION OF THE DRAWINGS

Other advantages and features of the present invention will be appreciated from the following description with reference to the appended Figures. Of course, individual features which are described in the respective embodiments can also be used in other embodiments, as long as this is not explicitly excluded or forbidden for technical reasons. In the drawings.

DETAILED DESCRIPTION OF THE PREFERRED EMBODIMENTS

Figure 1:
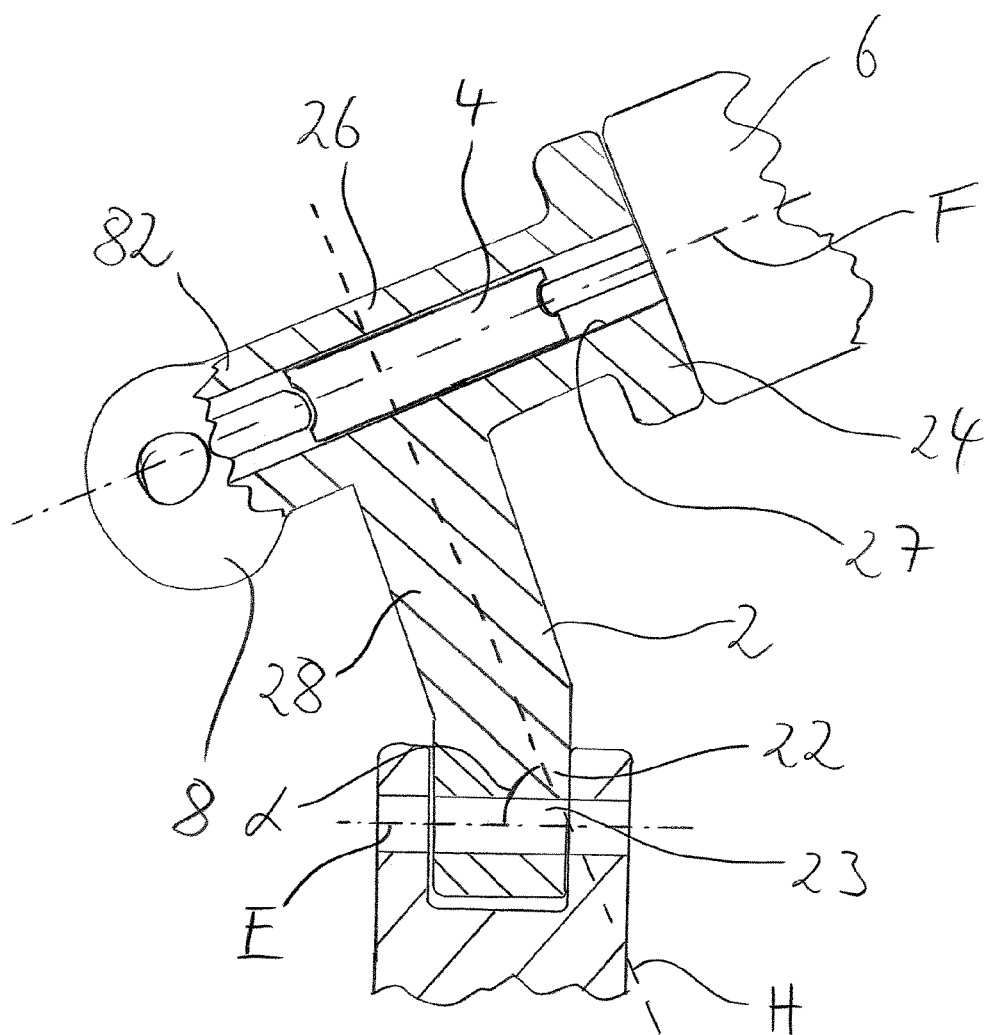
FIG. 1 is a schematic sectioned view of a first preferred embodiment of the support unit according to the invention.

In the schematically simplified sectioned view illustrated in FIG. 1 of a preferred embodiment of the carrier unit 2 according to the invention, the expansion wedge unit 8 with the housing 82 thereof is only partially sectioned and otherwise illustrated in a highly simplified manner. Adjacent to the housing 82 of the expansion wedge unit 8, the carrier unit has a guiding portion 26 in which a guiding element 4 is arranged so as to be able to be displaced and guided along the guiding axis F. The guiding portion 26 has in this instance in particular a guiding geometry 27 which is constructed in a particularly preferred manner as a cylindrical hollow space in the guiding portion 26 and which secures the guiding element 4 against displacement transversely relative to the guiding axis F and facilitates sliding of the guiding element 4. Opposite the expansion wedge unit 8, the support unit 2 has a second flange portion 24, to which a brake cylinder 6 can be secured or is preferably secured. The housing 82 of the expansion wedge unit 8, the guiding portion 26 and the second flange portion 24 are in this instance preferably constructed integrally with a retention portion 28, wherein the retention portion extends substantially along a retention axis H. The retention portion 28 serves to position the upper portion of the support unit 2 relative to a chassis of the utility vehicle illustrated in the lower region of the image. In order to secure the carrier unit 2 to the chassis of the utility vehicle, the support unit preferably has a first flange portion 22, which can be secured by means of a first engagement geometry 23 indirectly and/or directly to the chassis of the utility vehicle. In the preferred embodiment illustrated in FIG. 1, there is, for example, a corresponding portion of the chassis which is constructed in a fork-like manner. The first flange portion 22 of the support unit 2 can be inserted in this portion of the chassis and subsequently secured with a screw 10 by means of the first engagement geometry 23 in the form of a through-hole. Advantageously, the first engagement geometry 23 extends substantially along an engagement axis E in this instance, wherein the engagement axis E is advantageously orientated parallel with an axial direction of the utility vehicle in order to be able to secure the support unit 2 to the utility vehicle in this axial direction. In a particularly preferred manner, the cross-section of the first engagement geometry 23 in the path along the engagement axis E is substantially constant, wherein smaller deviations, as present, for example, with a thread, are intended to be substantially constant. Furthermore, the retention axis H is preferably pivoted through an angle α relative to the engagement axis E, whereby the upper region of the support unit 2 and in a particularly preferred manner the expansion wedge unit 8 in the drawing are arranged to be offset to the left in the Figure relative to the first flange portion 22. Preferably, in the left region of the support unit 2 illustrated in FIG. 1, the arrangement of the brake jaws and the surrounding brake drum (both not illustrated) is provided. As a result of the oblique position of the retention axis H relative to the engagement axis E, the brake cylinder 6 arranged at the right-hand side of the Figure is pivoted upward in the Figure and consequently spaced further apart from the engagement axis E. The pivoting of the retention axis H relative to the engagement axis E consequently ensures optimal positioning of the support unit 2 within a brake system with respect to the adjacent components of the chassis.

Figure 2:
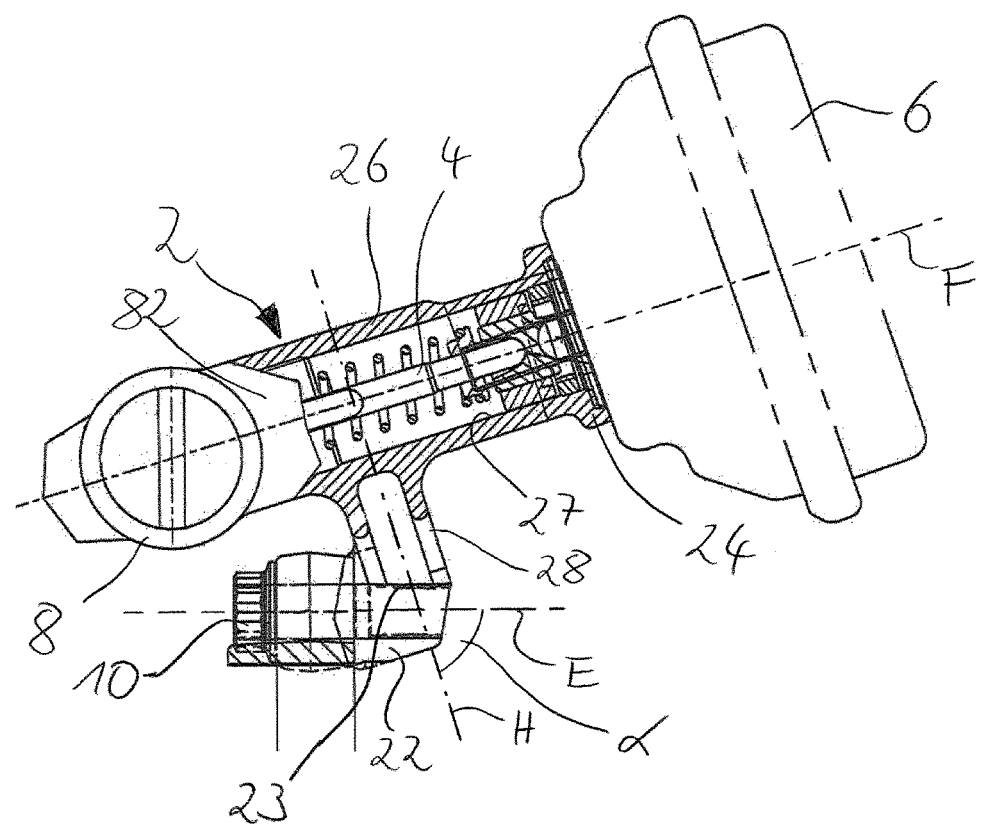
FIG. 2 is a second sectioned view of a preferred embodiment of the support unit according to the invention.

FIG. 2 is another sectioned view of a preferred embodiment of the support unit 2 according to the invention, wherein in contrast to the embodiment shown in FIG. 1, the support unit 2 has two retention portions 28 which are each provided substantially parallel with each other between the guiding portion 26 and the first flange portion 22 of the support unit. By the support unit 2 being constructed to be partially non-solid, but instead as a hollow member or in a web-like manner, with at the same time high bending torques which are intended to be absorbed by the web-like retention portions 28 of the support unit 2, the weight of the support unit 2 can be reduced considerably. In the embodiment shown in FIG. 2, the first engagement portion 23 is constructed as a threaded hole in which a securing element 10 can be reached from the side of the support unit 2 at which the expansion wedge unit 8 is located. That is to say, in the embodiment illustrated in FIG. 2, the securing element 10 can be reached when the brake drum which is preferably arranged in the left-hand portion of FIG. 2 (not shown) has been disassembled from the brake system. Advantageously, the second flange portion 24 has an extent parallel with the guiding axis F of approximately up to 30 mm, in a particularly preferred manner of from 14 to 16 mm, wherein, for the regions which are tested within the context of the present invention, the required strength could be achieved and at the same time the weight proportion of the second flange portion 24 could be kept low.

Figure 3:
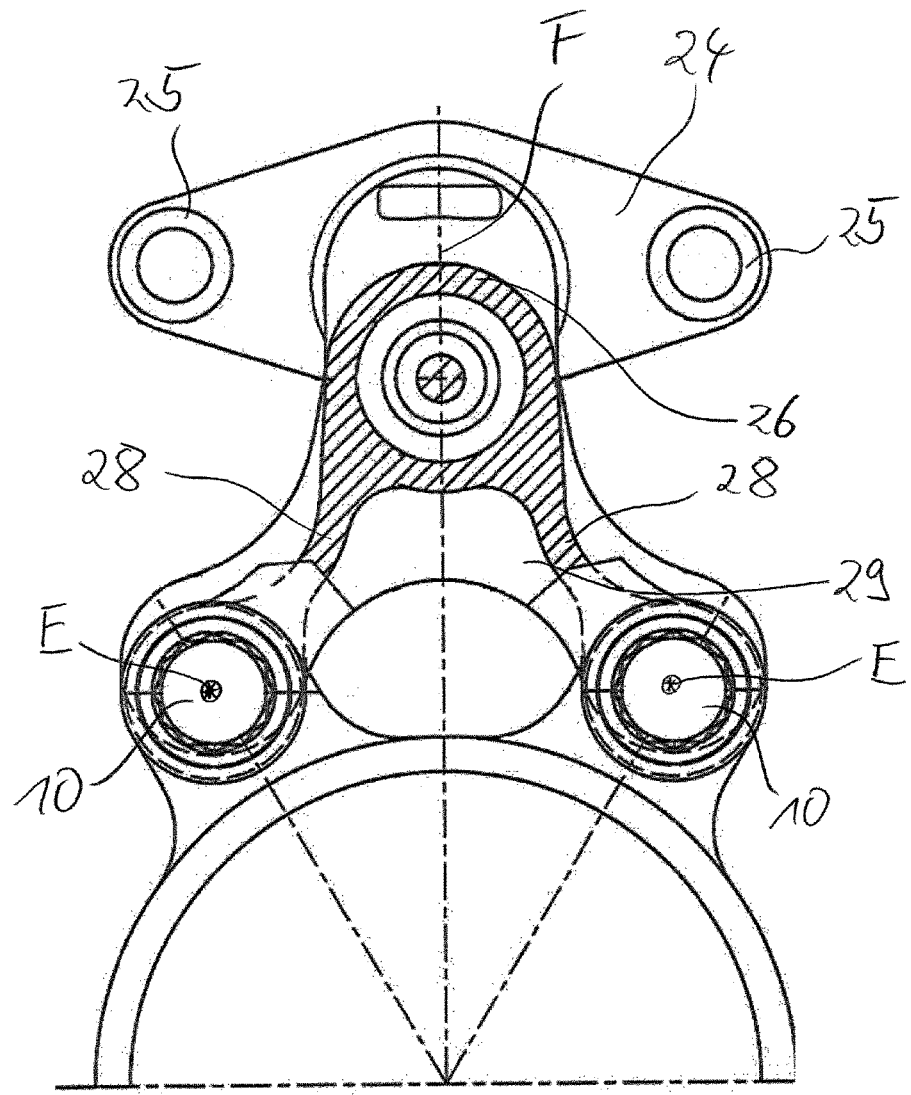
FIG. 3 is a partially sectioned view of a preferred embodiment of the support unit according to the invention.

FIG. 3 is a sectioned view of the preferred embodiment of the support unit 2 as already illustrated in FIG. 2, wherein in FIG. 3 the plane of section extends transversely relative to the engagement axis E. In this instance, it can be seen in FIG. 3 that not only does the support unit 2 have in a state offset along the engagement plane E at least one, preferably two retention portions 28, but also preferably two retention portions 28 are provided offset with respect to each other transversely relative to the engagement direction E. For the preferred embodiment illustrated in FIGS. 2 and 3, there are consequently at least two, preferably four individual retention portions 28 which are spaced apart from each other. It is further illustrated that the support unit 2 has two first flange portions 22 which are spaced apart from each other and which can be secured to a corresponding geometry of the chassis of the utility vehicle, which geometry is provided for this purpose. Furthermore, the cylindrical construction of the guiding geometry 27 of the guiding portion 26 can be seen, in which construction the guiding element 4 is displaceably arranged. The connection of the retention portions 28 to the guiding portion 26 and the respective first flange portion 22 is in this instance characterized by rounded outer geometries which permit a particularly favorable force flow and prevent notch effects. In FIG. 3, it is further possible to see the second flange portion 24 which preferably has two second engagement geometries which are spaced apart from each other and which are advantageously constructed as through-holes through which a corresponding bolt can be inserted and in this manner a brake cylinder with two securing locations can be secured to the second flange portion 24. Advantageously, the two second engagement geometries 25 have a spacing from each other which is at a ratio of from 0.9 to 1.1, preferably from 0.95 to 1.05 with respect to the spacing between the first two engagement geometries 23. In a particularly preferred manner, the spacing of the two second engagement geometries 25 is substantially equal to the spacing of the first engagement geometries 23 with respect to each other.

LIST OF REFERENCE NUMERALS

2—Carrier unit
4—Guiding element
6—Brake cylinder
8—Expansion wedge unit
10—Securing element
22—First flange portion
23—First engagement geometry
24—Second flange portion
25—Second engagement geometry
26—Guiding portion
27—Guiding geometry
28—Retention portion
29—Free space
82—Housing
α—Angle
E—Engagement axis
F—Guiding axis
H—Retention portion

The invention claimed is:

1. A support unit comprising:
a first flange portion;
a second flange portion;
a guiding portion;
a retention portion which adjoins the first flange portion and the guiding portion and which extends substantially along a retention axis, wherein the first flange portion, the retention portion and the guiding portion are integral with each other;
wherein the first flange portion has a first engagement geometry configured to secure the support unit to a chassis;
wherein the second flange portion has a second engagement geometry configured to secure a brake cylinder;
wherein the guiding portion is arranged adjacent to the second flange portion and has a guiding geometry configured to guide a guiding element along a guiding axis, wherein an expansion wedge unit is arranged adjacent to the guiding portion;
wherein the expansion wedge unit has a housing that is integral with the guiding portion; and
wherein the first engagement geometry extends substantially along an engagement axis, and wherein the retention axis is pivoted through an angle with respect to the engagement axis, wherein the angle is in the range from 45° to 89°.

2. The support unit as claimed in claim 1, wherein the second flange portion is integral with the guiding portion.

3. The support unit as claimed in claim 1, wherein the first flange portion has two engagement geometries which are arranged spaced apart from each other, and wherein the engagement axes of the engagement geometries extend parallel with each other.

4. The support unit as claimed in claim 3, further comprising:
two retention portions which are separated from each other by means of a free space; and
wherein a mean cross-sectional surface-area of the retention portions is at a ratio of from 0.2 to 1.3 with respect to the mean cross-sectional surface-area of the free space.

5. The support unit as claimed in claim 4, wherein the ratio is from 0.3 to 0.9.

6. The support unit as claimed in claim 5, wherein the ratio is from 0.5 to 0.8.

7. The support unit as claimed in claim 1, wherein the retention axis is located transversely relative to the guiding axis.

8. The support unit as claimed in claim 1, wherein the angle is in the range of 60° to 85°.

9. The support unit as claimed in claim 8, wherein the angle is in the range of 70° to 85°.

10. The support unit as claimed in claim 1, further comprising:
a securing element configured to move along the engagement axis into positive-locking engagement with the first engagement geometry; and
wherein the securing element is accessible from the side of the support unit at which the expansion wedge unit is located.

11. The support unit as claimed in claim 1, wherein the first flange portion has two engagement geometries which are arranged spaced apart from each other, and wherein the engagement axes of the engagement geometries extend parallel with each other.

12. The support unit as claimed in claim 1, having no more than four first engagement geometries.

13. The support unit as claimed in claim 12, having no more than two first engagement geometries.

14. A support unit comprising:
a first flange portion;
a second flange portion; and
a guiding portion;
wherein the first flange portion has a first engagement geometry configured to secure the support unit to a chassis;
wherein the second flange portion has a second engagement geometry configured to secure a brake cylinder;
wherein the guiding portion is arranged adjacent to the second flange portion and has a guiding geometry configured to guide a guiding element along a guiding axis, wherein an expansion wedge unit is arranged adjacent to the guiding portion;
wherein the expansion wedge unit has a housing that is integral with the guiding portion; and
wherein the first flange portion has two engagement geometries which are arranged spaced apart from each other, and wherein the engagement axes of the engagement geometries extend parallel with each other; and
further comprising:
two retention portions which are separated from each other by a free space.

15. The support unit as claimed in claim 14, wherein a mean cross-sectional surface-area of the retention portions is at a ratio of from 0.2 to 1.3 with respect to a mean cross-sectional surface-area of the free space.

16. The support unit as claimed in claim 15, wherein the ratio is from 0.3 to 0.9.

17. The support unit as claimed in claim 16, wherein the ratio is from 0.5 to 0.8.

18. The support unit as claimed in claim 14, wherein the second flange portion is integral with the guiding portion.

19. The support unit as claimed in claim 14, further comprising:
a retention portion which adjoins the first flange portion and the guiding portion and which extends substantially along a retention axis, wherein the first flange portion, the retention portion and the guiding portion are integral with each other.

20. The support unit as claimed in claim 19, wherein the retention axis is located transversely relative to the guiding axis.

21. The support unit as claimed in claim 14, further comprising:
a securing element configured to move along the engagement axis into positive-locking engagement with the first engagement geometry; and
wherein the securing element is accessible from the side of the support unit at which the expansion wedge unit is located.

22. The support unit as claimed in claim 14, wherein the first flange portion has two engagement geometries which are arranged spaced apart from each other, and wherein the engagement axes of the engagement geometries extend parallel with each other.

23. The support unit as claimed in claim 14, having no more than four first engagement geometries.

24. The support unit as claimed in claim 23, having no more than two first engagement geometries.

* * * * *